United States Patent

Jefferson et al.

[15] 3,678,468

[45] July 18, 1972

[54] DIGITAL DATA STORAGE SYSTEM

[72] Inventors: Donald E. Jefferson, Silver Spring; Ronald G. Vermillion, Rockville, both of Md.

[73] Assignee: the United States of America as represented by the Secretary of the Navy

[22] Filed: Dec. 15, 1970

[21] Appl. No.: 98,345

[52] U.S. Cl. .......... 340/172.5
[51] Int. Cl. .......... G01v 3/00, G11b 5/00
[58] Field of Search .......... 340/172.5; 324/1.2

[56] References Cited

UNITED STATES PATENTS

| | | | |
|---|---|---|---|
| 3,322,940 | 5/1967 | Barker et al. | 340/172.5 X |
| 3,151,312 | 9/1964 | Beck | 340/172.5 |
| 3,344,408 | 9/1967 | Singer et al. | 340/172.5 |
| 3,380,020 | 4/1968 | Clark | 340/172.5 X |
| 3,411,145 | 11/1968 | Cragon et al. | 340/172.5 |
| 3,438,019 | 4/1969 | Gowan | 340/172.5 X |
| 3,439,342 | 4/1969 | Barton | 340/172.5 |
| 3,582,901 | 6/1971 | Cochrane et al | 340/172.5 |

*Primary Examiner*—Paul J. Henon
*Assistant Examiner*—Melvin B. Chapnick
*Attorney*—R. S. Sciascia and J. A. Cooke

[57] ABSTRACT

A digital data storage system for an in-situ measuring device having a simplified logic to perform all of the functions required to record fourteen bit data words on six tape channels, with parallel-in and parallel-out processing between the measuring device sensors and the tape recorder. The storage system accepts and records sampled data and event data from the measuring device and records the time of occurrence of this data. An internal clock and associated logic determine the initiation and termination of sampling intervals, and other logic controls the transfer of data from temporary storage to tape.

11 Claims, 17 Drawing Figures

INVENTORS
Donald E. Jefferson
Ronald G. Vermillion
BY [signature]
ATTORNEY

| | TIME | $A_{14}$ | $A_{13}$ | $A_{12}$ | $A_{11}$ | $A_{10}$ | $A_9$ | $A_8$ | $A_7$ | $A_6$ | $A_5$ | $A_4$ | $A_3$ | $A_2$ | $A_1$ |
|---|---|---|---|---|---|---|---|---|---|---|---|---|---|---|---|
| | $T_T$ | $T_{14}$ | $T_{13}$ | $T_{12}$ | $T_{11}$ | $T_{10}$ | $T_9$ | $T_8$ | $T_7$ | $T_6$ | $T_5$ | $T_4$ | $T_3$ | $T_2$ | $T_1$ |
| 62 TIMES | $T_C$ | $C_{10}$ | $C_9$ | $C_8$ | $C_7$ | $C_6$ | $C_5$ | $C_4$ | $C_3$ | $C_2$ | $C_1$ | 0 | 0 | 0 | 0 |
| | $T_S$ | $S_{14}$ | $S_{13}$ | $S_{12}$ | $S_{11}$ | $S_{10}$ | $S_9$ | $S_8$ | $S_7$ | $S_6$ | $S_5$ | $S_4$ | $S_3$ | $S_2$ | $S_1$ |

Fig. 9 (a)

| | TIME | $CH_1$ | $CH_2$ | $CH_3$ | $CH_4$ | $CH_5$ | $CH_6$ | |
|---|---|---|---|---|---|---|---|---|
| 1ST CYCLE | $F_1$ | 1 | 1 | $T_{14}$ | $T_{13}$ | $T_{12}$ | $T_{11}$ | |
| | $F_2$ | $T_{10}$ | $T_9$ | $T_8$ | $T_7$ | $T_6$ | $T_5$ | |
| | $F_3$ | $T_4$ | $T_3$ | $T_2$ | $T_1$ | 1 | 1 | |
| 2ND CYCLE | $F_1$ | 1 | 1 | 0 | 0 | 0 | 0 | |
| | $F_2$ | 0 | 0 | 0 | 0 | 0 | 0 | |
| | $F_3$ | 0 | 0 | 0 | 0 | 1 | 1 | |
| 3RD CYCLE | $F_1$ | 1 | 1 | $C_{10}$ | $C_9$ | $C_8$ | $C_7$ | 62 TIMES |
| | $F_2$ | $C_6$ | $C_5$ | $C_4$ | $C_3$ | $C_2$ | $C_1$ | |
| | $F_3$ | 0 | 0 | 0 | 0 | 1 | 1 | |
| 4TH CYCLE | $F_1$ | 1 | 1 | $S_{14}$ | $S_{13}$ | $S_{12}$ | $S_{11}$ | |
| | $F_2$ | $S_{10}$ | $S_9$ | $S_8$ | $S_7$ | $S_6$ | $S_5$ | |
| | $F_3$ | $S_4$ | $S_3$ | $S_2$ | $S_1$ | 1 | 1 | |

Fig. 9(b)

DIGITAL DATA STORAGE SYSTEM

BACKGROUND OF THE INVENTION

This invention relates generally to data storage systems, and more particularly to a digital data storage system for use with an in-situ measuring device.

Many measuring devices and their associated data recording systems must remain for long periods of time at the site of the phenomenon being measured, and, frequently, the data recording systems must be operated from an internal source of energy, such as a battery. An example of such a system for measuring and recording the time, current speed, and direction of water flow is the Geodyne model A-850T tape recording current meter. Prior art digital data storage systems used in conjunction with in-situ measuring devices require large amounts of operational power as a result of complex logic circuitry and the utilization of high-power, inefficient logic elements. For example, bipolar transistors employed in the data processing circuitry limit the operational capabilities of a digital data storage system dependent upon batteries as a source of energy. Furthermore, prior art digital data storage systems exhibit low operational reliability due to the logic elements and circuit design employed. For example, magnetic latching relays having demonstrated low reliability are frequently used for memory devices, and a serial data format is used which is susceptible to degradation by system noise and to data propagation errors. In addition, many prior art digital data storage systems use specially selected components which make filed maintenance difficult. Finally, the serial data format of prior art systems requires a tape recorder step for each data bit which increases power consumption per bit of recorded data.

SUMMARY OF THE INVENTION

Accordingly, one object of the instant invention is to provide a new and improved digital data storage system for use with in-situ measuring devices.

Another object of the instant invention is the provision of a digital data storage system requiring low power.

Still another object of the present invention is the provision of a digital data storage system having simplified logic for use with in-situ measuring devices.

A further object of the instant invention is to provide a digital data storage system for in-situ measuring devices that is easily maintainable in field use.

Briefly, in accordance with one embodiment of this invention, these and other objects are obtained by providing a data storage system that receives digital sampled input data and event input data from an in-situ measuring device, generates digital timing data indicative of the time of occurrence of the input data, temporarily stores the timing data and input data and then permanently records the timing data and input data on magnetic tape, employing parallel-in, parallel-out data processing circuitry.

BRIEF DESCRIPTION OF THE DRAWINGS

FIG. 9*a* is a loading chart for the temporary storage register of FIG. 8, showing the contents of each stage of the storage register as a function of the various data transfer pulses;

FIG. 9*b* is a loading chart for the tape recorder write circuits of FIG. 10, showing the inputs to each channel of the tape recorder as a function of time;

DESCRIPTION OF THE PREFERRED EMBODIMENT

Figure 1:
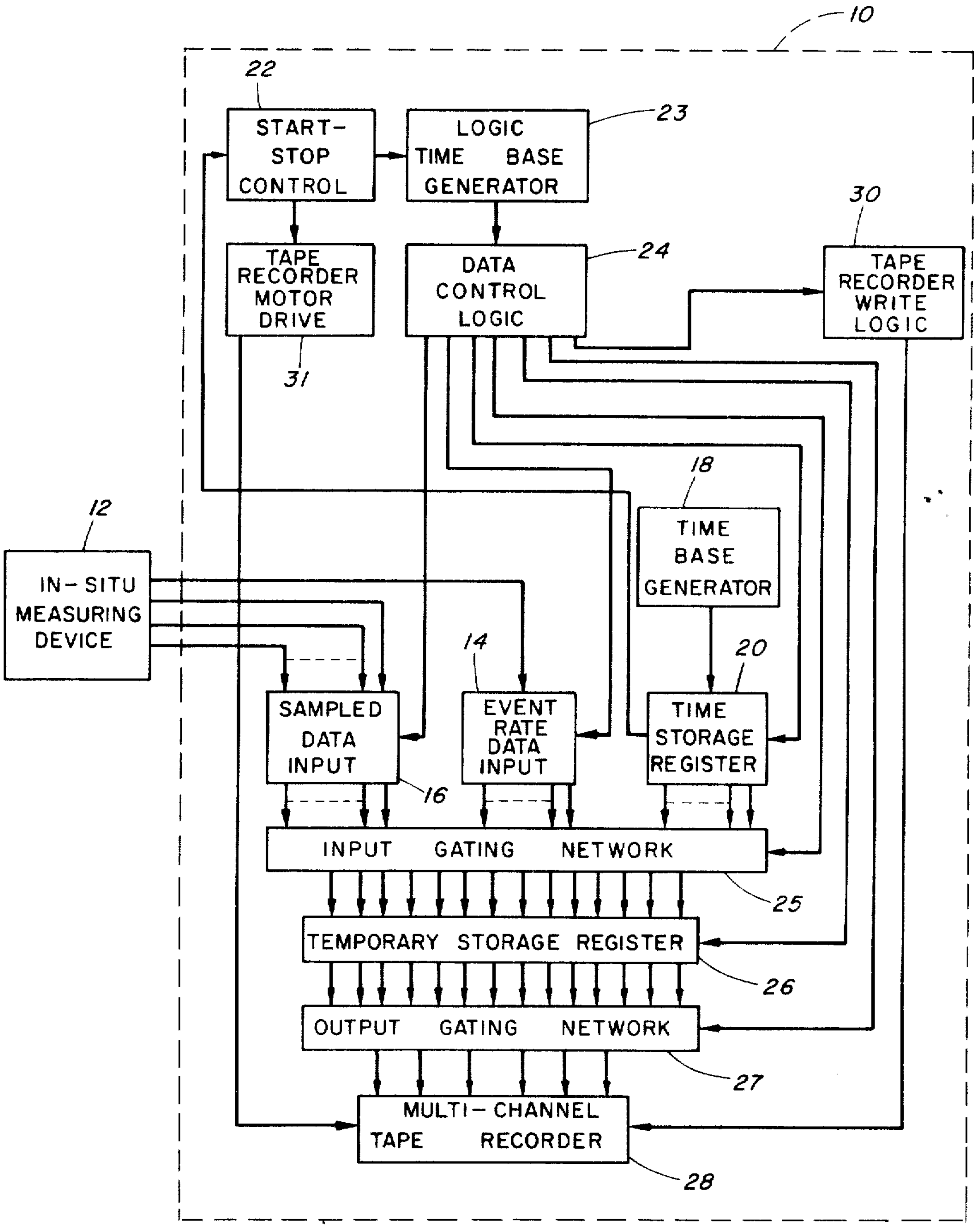
FIG. 1 is a block diagrammatic view of the digital data storage system of the present invention.

Referring now to the drawings wherein like reference characters designate identical or correspondinG parts throughout the several views, and more particularly to FIG. 1 which illustrates a data storage system 10 that receives digital input data from an in-situ measuring device 12, such, for example, as a water current meter for measuring current speed and direction. Digital event data, such as a pulse stream generated by a Savonius rotor which sequentially actuates magnetically coupled switches as it rotates is fed to an event rate data input circuit 14, more fully described hereinafter with reference to FIG. 3. Digitally coded data from the in-situ measuring device is sampled by a sampled data input circuit 16 at regular intervals, as more fully described hereinafter with reference to FIG. 4. For example, if the in-situ measuring device 12 is a water current meter measuring water current direction with a current direction vane that is magnetically coupled to an internal electro-optical vane follower, and the vane follower digitally encodes the direction of the vane into a digital word, the individual bits of the binary word are sampled periodically by the sampled data input circuit 16. An example of a device utilizing this type of digital encoding scheme is the Geodyne Model A-850T tape recording current meter.

Data storage system 10 contains an internal time base generator 18 and a time storage circuit 20, more fully described with reference to FIG. 2, for generating a real time signal indicating the time of occurrence of the various events measured by in-situ measuring device 12. A start-stop control circuit 22, more fully described hereinafter with reference to FIG. 11, controls the operation of a logic time base generator 23, more fully described hereinafter with reference to FIG. 5, which provides clocking signals for the internal operation of the system logic. In response to these clocking signals, a data control logic circuit 24 performs various logic functions necessary for the initiation and termination of the sampling intervals, and the recording of the input data, as will be more fully described with reference to FIG. 6. The input information from sampled data input 16 and event rate data input 14, and the time information from time storage register 20 are fed to an input gating network 25, to be more fully described with reference to FIGS. 7*a* and 7*b* and sequentially transferred to a parallel-in, parallel-out temporary storage register 26, whose operation is more fully described hereinafter with reference to FIG. 8, in response to transfer signals generated by data control logic 24. This information is then parallel shifted out of temporary storage register 26 to an output gating network 27 which produces a sequence of digital words six bits long, that are applied to a multi-channel tape recorder 28. Tape recorder 28 is under the control of a tape recorder drive 31, more fully described hereinafter with reference to FIG. 12.

Figures 2, 5:
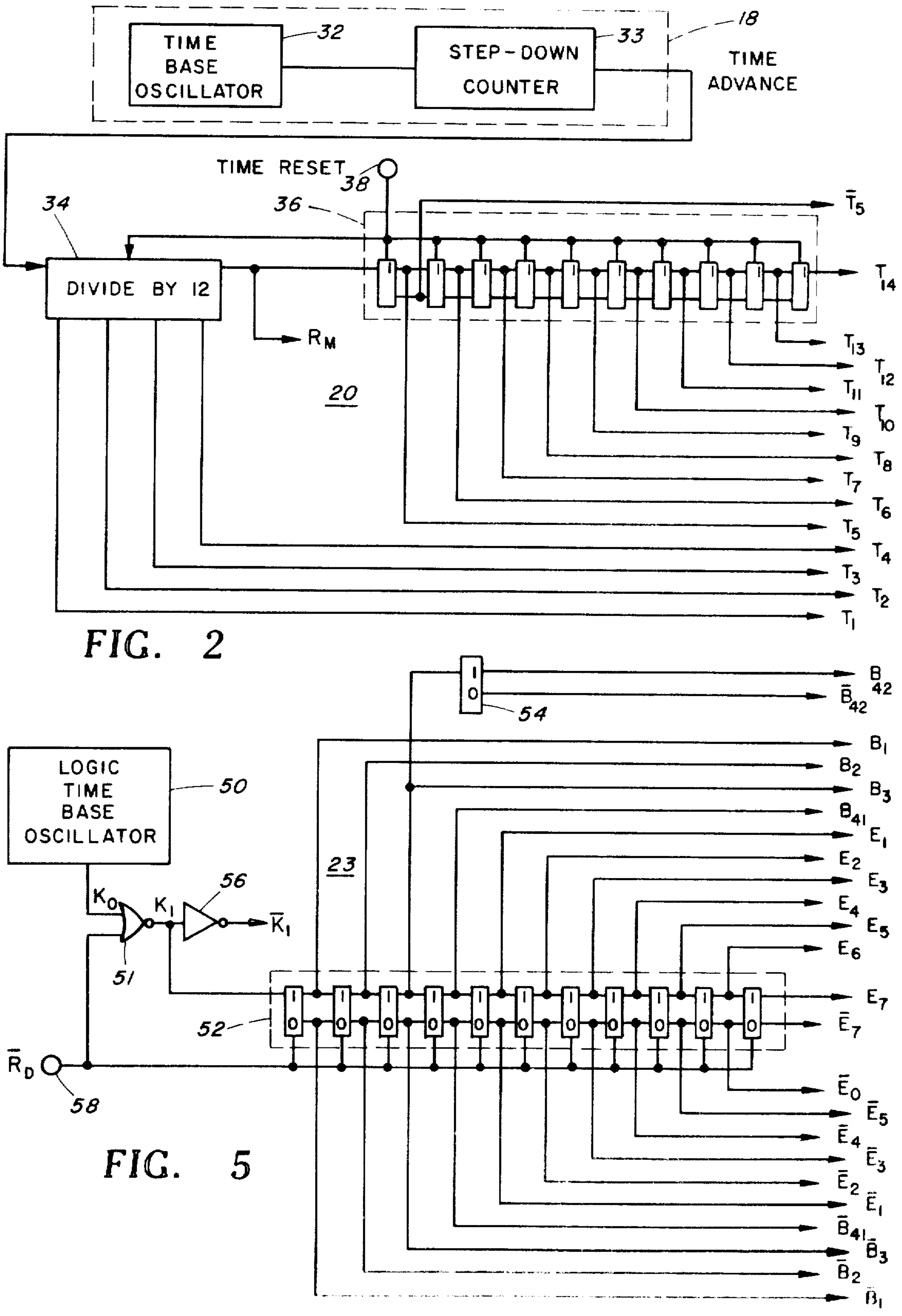
FIG. 2 is a block diagrammatic and schematic view of the time base generator and time storage circuitry according to the present invention.
FIG. 5 is a schematic view of the logic time base generator of the present invention.

Referring now to FIG. 2, time base generator 18 is shown as consisting of a time base oscillator 32, such as a crystal oscillator, coupled to a step-down counter 33, such as a binary ripple-through counter. Time base oscillator 32 has a fixed frequency of 28 Khz, and step down counter 33 has 23 stages of binary division, so that a time advance signal is generated at approximately 5 minute intervals. This time advance signal is used to determine the time of occurrence of the input data to an accuracy of 5 minutes, but it should be understood that time increments of other than 5 minutes magnitude may be employed, depending upon the time accuracy requirements of the system, by using a time base oscillator having a different frequency, and a step-down counter 32 having a different number of stages.

The time advance signal is fed to time storage circuit 20 consisting of a conventional divide-by-twelve circuit 34 and an hour counter circuit 36. Divide-by-12 counter circuit 34 has four outputs $T_1$, $T_2$, $T_3$, and $T_4$, representing, respectively, intervals of approximately 5, 10, 20 and 40 minutes. When outputs $T_3$ and $T_4$ are simultaneously activated, indicating an interval of 60 minutes, divide-by-12 counter 34 produces an output signal $R_M$, which internally resets divide-by-12 counter in a conventional manner and also toggles hour counter 36. Hour counter 36 has 10 stages in the instant embodiment, each stage having an output $T_i$ ($i = 5,6, \ldots 14$), and, therefore, it is capable of counting $2^{11}-1$ or 2047 hours. Thus, the output of time storage register 20 is a 14 bit word, wherein the first four bits, $T_1 - T_4$, represent 1 hour in 5 minute increments, and the last 10 bits, bit, $5 - T_{14}$, represent the number of elapsed hours. However, it should be understood that time storage registers having different word lengths may be used, depending on the word size processable in the remainder of the system and the time accuracy desired. Time storage register 20 may also be reset to zero time by the application of a reset pulse to a terminal 38, which is connected to the reset inputs of each flip-flop in time storage register 20. It should be noted that the logic functions of the instant invention can be implemented by conventional circuitry, but for the low power capability which is an essential part of this invention the logic elements employed in the circuitry of FIG. 2 as well as the circuitry in the remainder of the instant data storage system should be complementary symmetry, metal oxide semiconductors (COS/MOS). Among the unique features of COS/MOS integrated circuitry which make them particularly suitable for the instant invention are low operating power, source or sink capability, virtually unlimited fan out, wide range of operating voltage, high noise immunity, very high input impedance, and very low output impedance.

Figure 3:
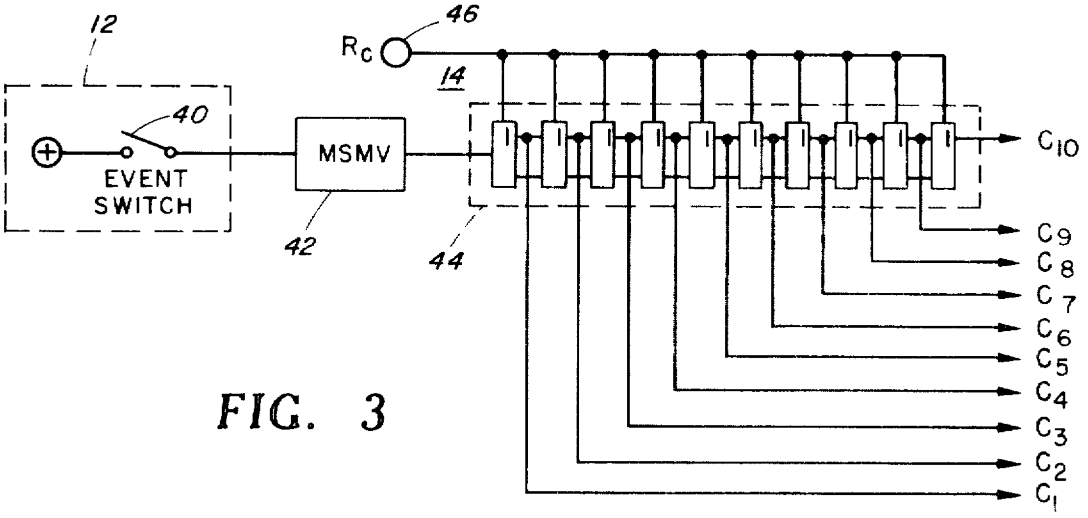
FIG. 3 is a schematic view of the event data input circuitry of the present invention.

FIG. 3 illustrates event rate data input circuit 14. A switch 40 in in-situ measuring device 12 closes upon the occurrence of a specified event. For example, switch 40 may be a magnetically actuated reed switch that closes as each magnet on a Savonius rotor passes by, as in the Geodyne Model A-850T current meter described hereinbefore. Upon the closure of switch 40, a conventional monostable multivibrator 42 in event rate data input circuitry 14 is triggered and a pulse is transmitted to a conventional binary step-down counter 44. In the embodiment of the instant invention, binary counter 44 has 10 stages, resulting in an event counter word of 10 bits, $C_i$ ($i = 1,2 \ldots 10$). After events have been counted for a preset interval determined by data control logic 24, as described hereinafter, a signal $R_c$ is applied to a terminal 46 of step-down counter 44, connected to the reset inputs of the flip-flops, whereupon counter 44 is reset to zero count. It should be understood that event counter 44 may have a different number of stages, depending upon the maximum number of events expected to be counted. Thus, events are counted for a preset period of time, thereby producing an event rate of occurrence output from event rate data input circuit 14.

Figure 4:
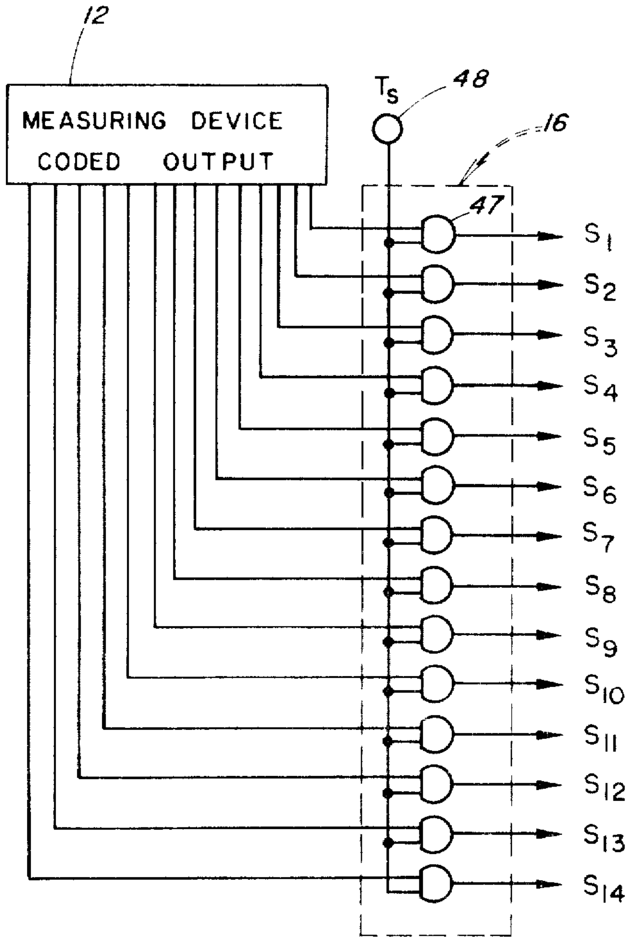
FIG. 4 is a schematic view of the sampled data input circuitry of the present invention.

The sampled data input circuit 16 is shown in FIG. 4 as consisting of 14 AND gates 47. Each gate has as an information input a bit from a continuously changing digitally encoded data word of in-situ measuring device 12, such as may be generated by an analog to digital converter. A transfer signal $T_s$ is applied to each AND gate 46 through a terminal 48 at a preset sampling rate determined by data control logic 24, as more fully described hereinafter. Thus, a sampled data output word of 14 bits $S_i$ ($i = 1,2 \ldots 14$) is generated by sampled data input circuitry 16 upon the occurrence of transfer signals $T_s$. It should be understood, however, that sampled data input 16 may have other than 14 gates, depending upon the word length of the binary encoded word of in-situ measuring device 12.

It should also be understood that the transfer signal $T_s$ may be used to sample other types of digital output signals from the in-situ measuring device, depending upon the nature of the output coded word to be strobed into the data storage system. For example, if the measuring device is a water current meter, such as the Geodyne model A-850T, the direction of flow is developed into a digital output signal by an electronic vane follower assembly consisting of a set of small weak magnets and a gray binary encoding disc attached to a shaft allowing 360° of rotation, a lamp assembly and fiber optic light pipes for transmitting the encoded follower position to an electronic photocell assembly. In this system, transfer signal $T_s$ can be applied simultaneously to the lamp circuitry and the photocell circuitry. The lamp would light, thereby illuminating those photocells left exposed by the gray binary encoding disc, and lowering their resistance, and simultaneously a large current would pass through the exposed photocells, indicative of one binary value, while only a very small current would pass through the unexposed photocells, indicative of the second binary state.

The logic time base generator 23 of FIG. 1 is illustrated in greater detail in FIG. 5 as including a logic time base oscillator 50 which may be, for example, an RC oscillator, providing a clocking signal $K_o$ at a frequency of 6.4 Hz. $K_o$ is applied to a NOR gate 51 which is enabled by a signal $R_o$ generated in start-stop control circuit 22, as more fully described hereinafter with reference to FIG. 11. Output $K_1$ from NOR gate 51 is applied to a conventional binary step-down counter 52 having eleven stages. The true outputs from the first four stages are labelled, respectively, $B_1$, $B_2$, $B_3$ and $B_{41}$, while the true outputs from the last seven stages are labelled $E_1$–$E_7$, respectively. These outputs, as well as the complementary outputs from each stage are utilized in the data control logic 24 of FIG. 6, as more fully described hereinafter. The output $B_3$ of the third stage of step down counter 52 is applied to a flip-flop 54 having a true output $B_{42}$, which is utilized in temporary storage register 26 of FIG. 8 and start-stop control circuit 22 of FIG. 11, more fully described hereinafter. An inverter 56 provides the complementary output $\overline{K}_1$ of clock output $K_1$, which is used in the data control logic of FIG. 6. Step-down register 52 is reset by signal $\overline{R}_d$ applied to a terminal 58. Thus when NOR gate 51 is disabled by $\overline{R}_d$, counter 52 is reset to zero by $\overline{R}_d$.

Figure 6:
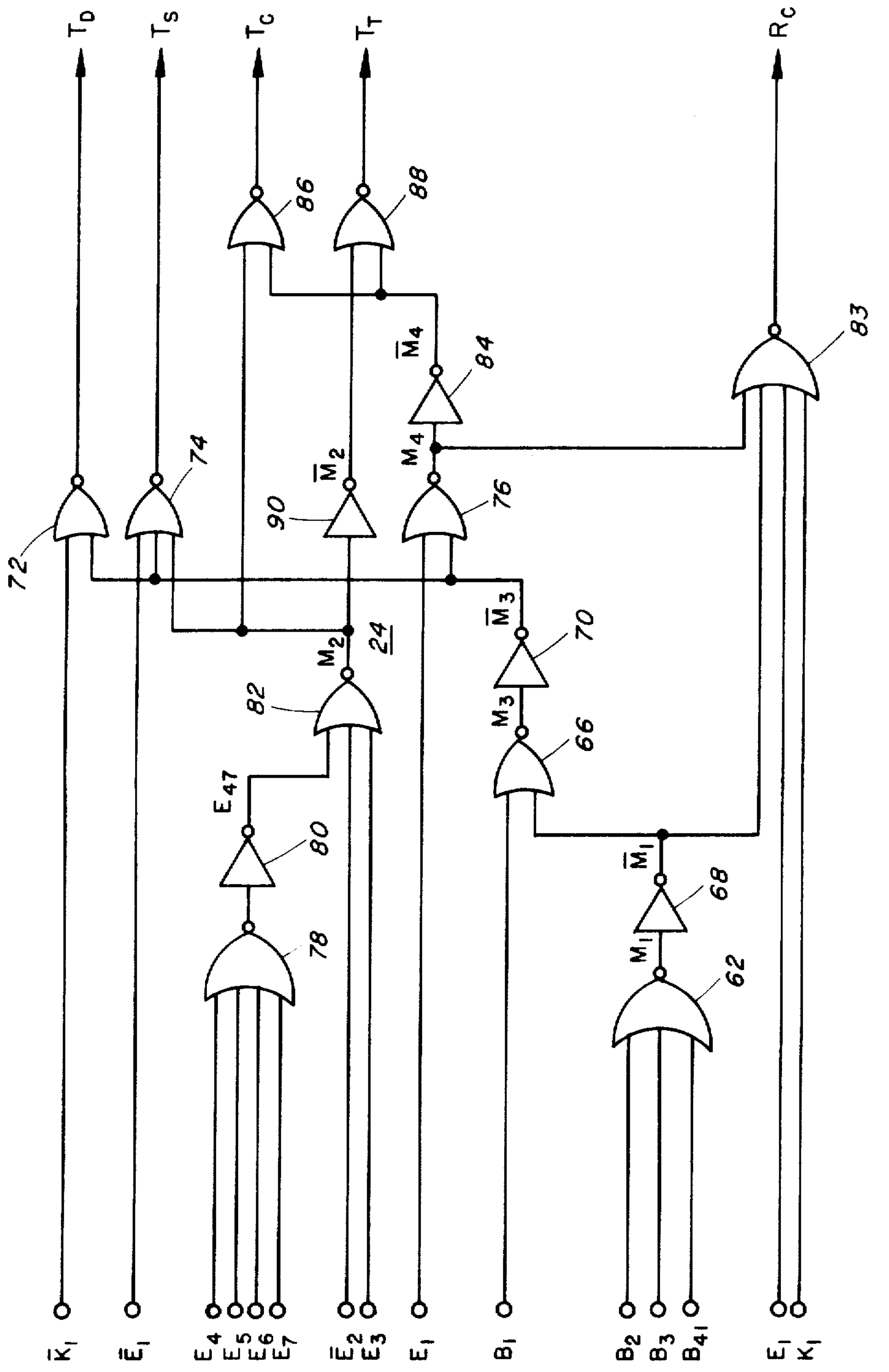
FIG. 6 is a schematic logic view of the data control logic circuitry.
Figure 7A:
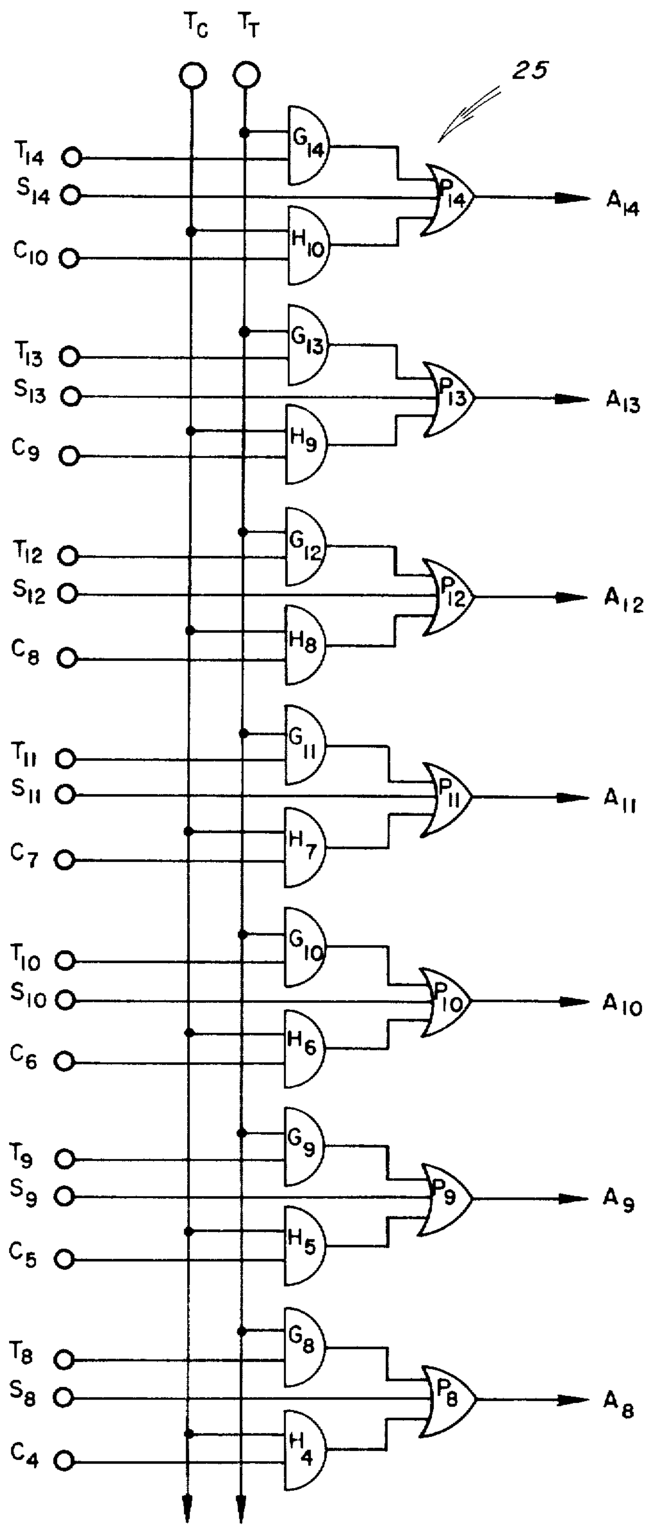
FIG. 7*a* and 7*b* are schematic views of the input gating network.
Figure 7B:
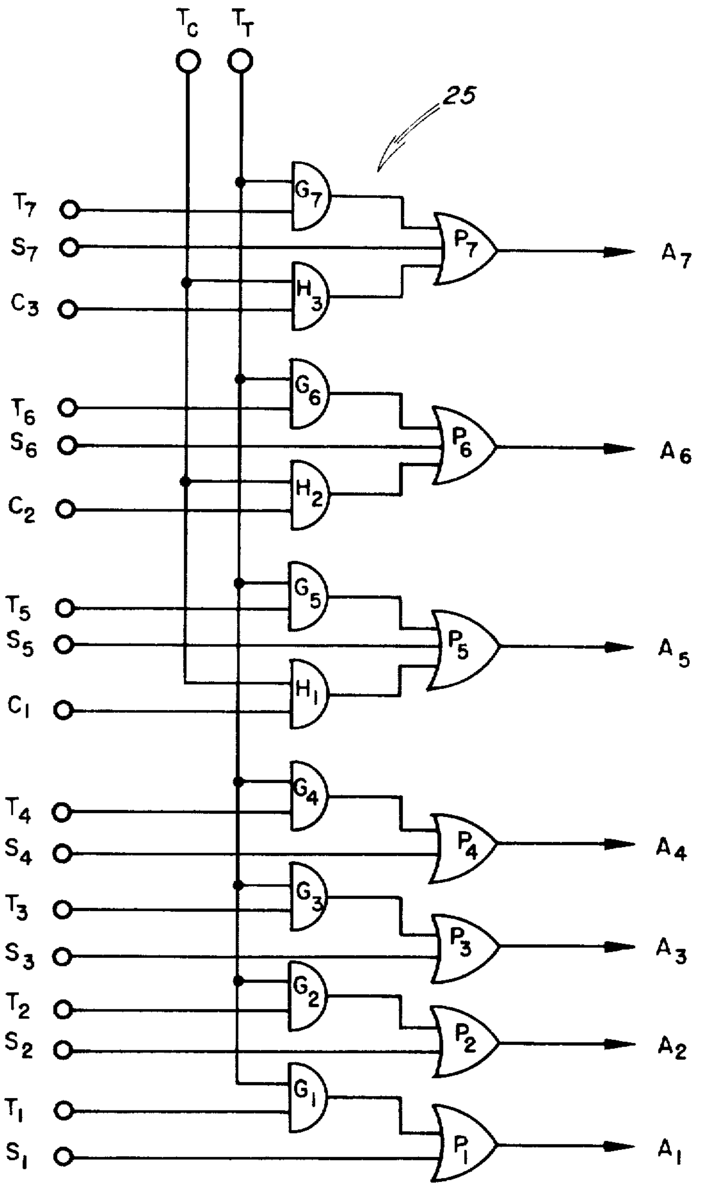

The data control logic 24 of FIG. 1 is illustrated in greater detail in FIG. 6. Outputs $B_2$, $B_3$, and $B_{41}$ from counter 52 are applied to a NOR gate 62 having an output $M_1 = \overline{B}_2\, \overline{B}_3\, \overline{B}_{41}$. Output $B_1$ from counter 52 is fed to a NOR gate 66. $\overline{M}_1$ is produced in an inverter 68 and fed to NOR gate 66, producing an output $M_3 = M_1\, \overline{B}_1$. Outputs $E_4$ — $E_7$ from counter 52 are fed to a NOR gate 78, the output of which, in turn, is fed to an inverter 80 thereby producing an output $E_{47} = E_4 + E_5 + E_6 = E_7$. Outputs $\overline{E}_2$ and $E_3$ from counter 52 and output $\overline{E}_{47}$ are fed to a NOR gate 82, producing an output $M_2 = E_2\, \overline{E}_3\, \overline{E}_{47}$. $\overline{M}_3$ is produced in an inverter 70, and fed to NOR gates 72, 74 and 76. The inverted logic time base clock signal $\overline{K}_1$ is fed to NOR gate 72, thereby producing an output signal $T_d = M_3\, K_1$, which is used for transferring data from temporary storage register 26 to multi-channel tape recorder 28. Output $\overline{E}_1$ from counter 52 and $M_2$ are fed to NOR gate 74, thereby producing an output $T_s = M_3\, E_1\, \overline{M}_2$, the transfer signal for sampled data input circuitry 16.

Output $E_1$ from counter 52 is applied to a NOR gate 76, producing a signal $M_4 = M_3\, \overline{E}_1$. Output $E_1$ from counter 52 is also fed to a NOR gate 83, along with logic time base clocking signal $K_1$, $\overline{M}_1$, and $M_4$, producing $R_c = M_1\, \overline{M}_4\, \overline{E}_1\, \overline{K}_1$, wherein $R_c$ is the reset signal for step down counter 44 of event rate data input circuit 14. $\overline{M}_4$ is produced by an inverter 84, and applied to NOR gates 86 and 88. $M_2$ is applied to NOR gate 86 producing an output $T_c = \overline{M}_2\, M_4$. $\overline{M}_2$ is produced in an inverter 90 and applied to NOR gate 88, producing therefrom a signal $T_c = M_2 M_4$. Signals $T_c$ and $T_t$ transfer data into temporary storage register 26 from input gating network 25, as more fully described hereinafter.

FIGS. *7a* and *7b* illustrate input gating circuitry 25 for sequentially transferring the time data, event rate data, and sampled data from time storage register 20, event rate data input 14, and sampled data input 16, respectively, to temporary storage register 26. Time word bit $T_i$ is applied to the input of AND gate $G_i$, and is passed through AND gate $G_i$ ($i$=1,2 , . . . 14) by digital timing data transfer signal $T_t$. Similarly, event rate data bit $C_j$ is applied to AND gate $H_j$ ($j$=1,2 , . . .10) and is strobed therethrough by digital event data transfer signal $T_c$. For =1,2,3,4, sampled data bit $S_i$ and the output of AND gate $G_i$ are applied to an OR gate $P_i$, producing an output $A_i t_i T_t = S_i$. Similarly, for $i$=5,6, , . . 14, sampled data but $S_i$ and the outputs of AND gates $G_i$ and $H_{i+4}$ are applied to OR gate $P_i$, producing an output $A_i = T_i T_t + C_{i-4} T_c + S_i$. It will be noted from FIG. 13*b* that in the specific embodiment disclosed transfer signals $T_c$ and $T_s$ are generated 62 times for each time $T_t$ is generated. Thus, for each time word recorded, 62 sampled data words and 62 event rate data words are recorded. It will also be noted from FIG. 13*a* that the pulse $R_c$, which resets event rate counter 44, is generated immediately after event transfer signal $T_c$, so that event rate counter 44 immediately begins counting a new sequence of events for a time corresponding to the interval between pulses $T_c$.

Figure 8:
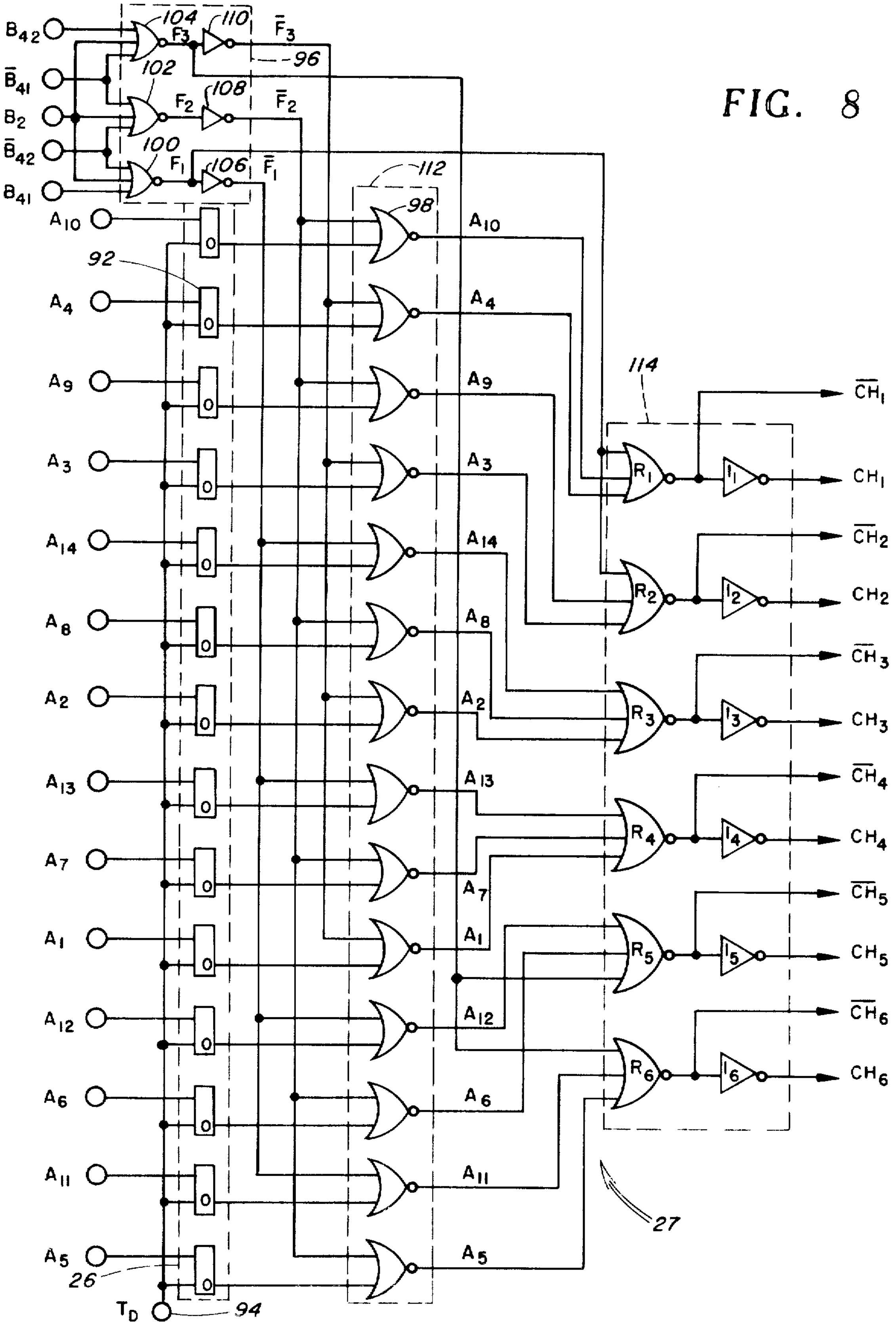
FIG. 8 is a schematic view of the temporary storage register and output gating network.
Figure 13A:
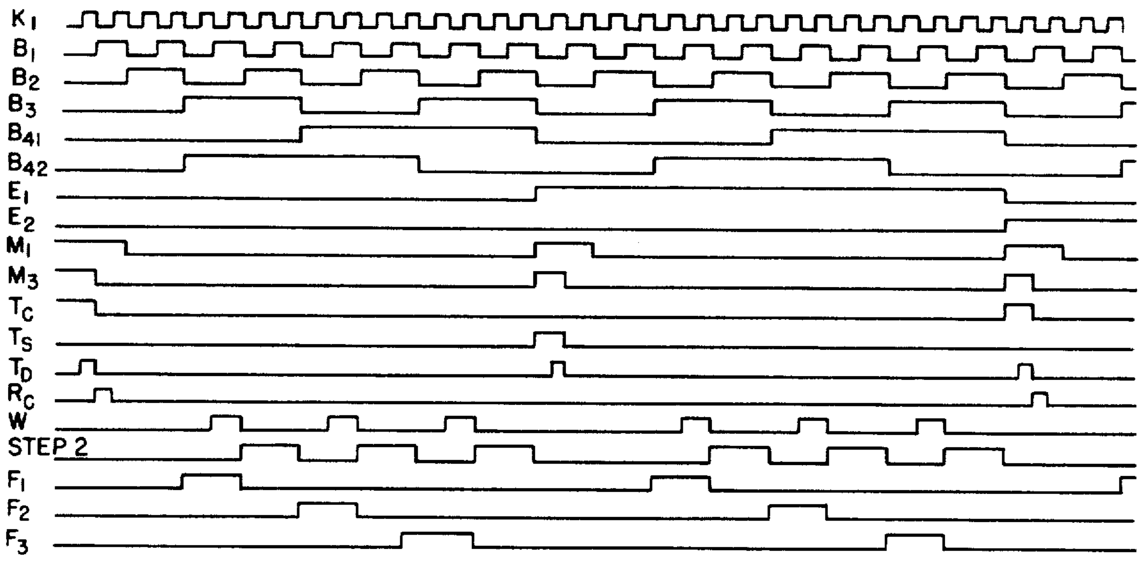
FIGS. 13*a*, 13*b*, and 13*c* are timing diagrams for the present invention.
Figure 13B:
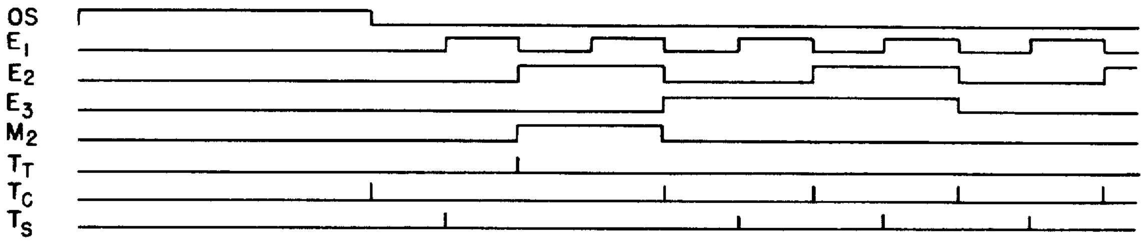

Referring now to FIG. 8, the temporary storage register 26 is shown as consisting of a number of conventional clocked flip-flops 92, each having as its data input a bit $A_i$ ($i$=1, 2 . . . 14) from the gating networks of FIGS. *7a* and *7b*. The data bits $A_i$ are transferred into their respective flip-flops by the temporary storage transfer signal $T_d$ applied to terminal 94 which, as described hereinbefore in connection with FIG. 6, is generated in the data control logic circuitry 24. It will be noted from FIG. 13*a* that transfer pulse $T_d$ is generated within a time period that transfer pulses $T_c$ and $T_s$ are generated, and it should be understood that transfer pulse $T_d$ is also generated within the time period that the much less frequent pulse $T_t$ is generated. Thus, during the times that data is present at the outputs of input gating network 25 due to transfer pulses $T_c$, $T_s$, and $T_t$, it is simultaneously parallel clocked into temporary storage register 26. It should be apparent that the number of flip-flops 92 in temporary storage register 26 correspond to the number of bits in the largest data words, which in this embodiment are the time words and event data words. After inputs $A_1$–$A_{14}$ have been parallel transferred into temporary storage register 26, selective ones are sequentially parallel passed through a gating network 112 in output gating network 27 by means of a sequential timing circuit 96, as more fully described hereinafter. Outputs $B_{41}$, $\overline{B}_{42}$ and $B_2$ from counter 52 are applied to a NOR gate 100 in sequential timing circuit 96 producing an output $F_1 = \overline{B}_{41} B_{42} \overline{B}_2$ therefrom. Output $B_{42}$, $B_2$ and $\overline{B}_{41}$ from counter 52 of FIG. 5 are applied to a NOR gate 102 in sequential timing circuit 96 producing an output $F_2 = B_{42} \overline{B}_2 B_{41}$ therefrom. Outputs $B_2$, $\overline{B}_{41}$, and $B_{42}$ from counter 52 are applied to a NOR gate 104 in sequential timing circuit 96 producing an output $F_3 = \overline{B}_2 B_{41} \overline{B}_{42}$ therefrom. Inverters 106, 108, and 110 produce, respectively, outputs $\overline{F}_1$, $\overline{F}_2$ and $\overline{F}_3$ from NOR gates 100, 102 and 104, respectively. Sequential timing circuit outputs $F_1$, $F_2$, and $F_3$ are illustrated in FIG. 13*a*.

The false output from each flip-flop 92 in temporary storage register 26 is fed to a two-input NOR gate 98 in gating network 112. Signal $\overline{F}_1$ is fed as the second input to those NOR gates in gating network 112 which receive data bits $A_{11}$–$A_{14}$ from temporary storage register 26. Signal $\overline{F}_2$ is fed as the second input to those NOR gates in gating network 112 which receive data bits $A_5 - A_{10}$ from temporary storage register 26. Signal $\overline{F}_3$ is fed as the second input to those NOR gates in gating network 112 which receive data bits $A_1 - A_4$ from temporary storage register 26. Thus, with the occurrence of transfer signal $\overline{F}_1$, temporarily stored data bits $A_{11} - A_{14}$ are parallel transferred through gating network 112; with the occurrence of transfer signal $\overline{F}_2$ temporarily stored data bits $A_5 - A_{10}$ are parallel transferred through gating network 112; and with the occurrence of transfer signal $\overline{F}_3$ temporarily stored data bits $A_1 - A_4$ are parallel transferred through gating network 112. It will be noted that the transfer sequence consists of four bits ($A_{11} - A_{14}$), six bits ($A_5 - A_{10}$), and four bits ($A_1 - A_4$), for reasons more to be fully discussed hereinafter.

The outputs from gating network 112 are applied to a second gating network 114 in output gating network 27 which further processes the data so that it may be recorded on multi-channel tape recorder 28. Outputs $A_{10}$ and $A_4$ from gating network 112, and transfer signal $F_1$ are applied to a NOR gate $R_1$ in gating network 114, thereby producing an output $\overline{CH}_1 = \overline{A}_4 \overline{A}_{10} \overline{F}_1$. Outputs $A_9$ and $A_3$ from gating network 112 and transfer signal $F_1$ are applied to a NOR gate $R_2$ in gating network 114 to produce an output $\overline{CH}_2 = \overline{A}_3 \overline{A}_9 \overline{F}_1$. Outputs $A_2$, $A_8$ and $A_{14}$ from gating network 112 are applied to a NOR gate $R_3$ in gating network 114 to produce an output $\overline{CH}_3 = \overline{A}_2 \overline{A}_8 \overline{A}_{14}$. Outputs $A_1 A_7$, and $A_{13}$ from gating network 112 are applied to a NOR gate $R_4$ in gating network 114 to produce an output $\overline{CH}_4 = \overline{A}_1 \overline{A}_7 \overline{A}_{13}$. Outputs $A_6$ and $A_{12}$ from gating network 112 and transfer signal $F_3$ are applied to a NOR gate $R_5$ in gating network 114 to produce an output $\overline{CH}_5 = \overline{A}_6 \overline{A}_{12} \overline{F}_3$. Finally, outputs $A_5$ and $A_{11}$ from gating network 112 and transfer signal $F_3$ are applied to a NOR gate $R_6$ in gating network 114 to produce an output $\overline{CH}_6 = \overline{A}_5 \overline{A}_{11} \overline{F}_3$. Output $\overline{CH}_i$ in gating network 114 is applied to inverter $I_i$ to produce an inverter output $CH_i$ ($i$=1,2 . . . 6).

The overall operation of temporary storage register 26 and output gating network 27 of FIG. 8 may be more readily understood with reference to the charts of FIGS. 9*a* and 9*b*. FIG. 9*a* indicates the input values $A_1 - A_{14}$ to temporary storage register 26 as a function of timing pulses $T_t$, $T_c$ and $T_s$. As described hereinbefore, for each time data transfer pulse $T_t$ transfer pulses $T_c$ and $T_s$ occur 62 times. It will be noted that since the event data words consist of only 10 bits $C_1 - C_{10}$ zeros are entered into the temporary storage register for bits $A_1 - A_4$ upon the occurrence of transfer signal $T_c$. It should be evident that if the time storage words or sampled data words were less than 14 bits long, zeros would similarly be entered into the unused bits. FIG. 9*b* indicates the outputs $CH_1$ –$CH_6$ from output gating circuitry 114 as a function of transfer pulses $F_1$, $F_2$ and $F_3$. It will be recalled that when $F_1$ is applied only four temporarily stored bits $A_{11} - A_{14}$ are transferred that when $F_2$ is applied six temporarily stored data bits $A_5 - A_{10}$ are transferred and that when $F_3$ is applied only four temporarily stored data bits $A_1 - A_4$ are transferred. The result of this process is shown in FIG. 9*b*, wherein it will be noted that outputs $CH_1$ and $CH_2$ for transfer pulse $F_1$ and outputs $CH_5$ and $CH_6$ for transfer pulse $F_3$ are binary ones. As indicated in FIG. 9*b* the first cycle of transfer pulses $F_1$, $F_2$, $F_3$ parallel transfers out of temporary storage register 26 the time storage information with the aforementioned leading and trailing ones. The second cycle of transfer pulses $F_1$, $F_2$, $F_3$ produces no information, as evidenced by the fact that binary zeros are contained in all information locations. However, it should be apparent that this cycle could be used for another data word, such as an identification code indicative of the date of operation or instrument number. The third transfer cycle produces the 10 bit event rate data word at the output of gating output circuitry 114, including the aforementioned four zeros, upon the application of transfer pulse $F_3$. During the fourth transfer cycle the sampled data $S_1 - S_{14}$ is parallel transferred out of temporary storage register 26. The third and fourth cycles then repeat 61 times to thereby transfer all of the sampled data and event rate data to the multichannel tape recorder 28 before the beginning of another time period.

Figure 10:
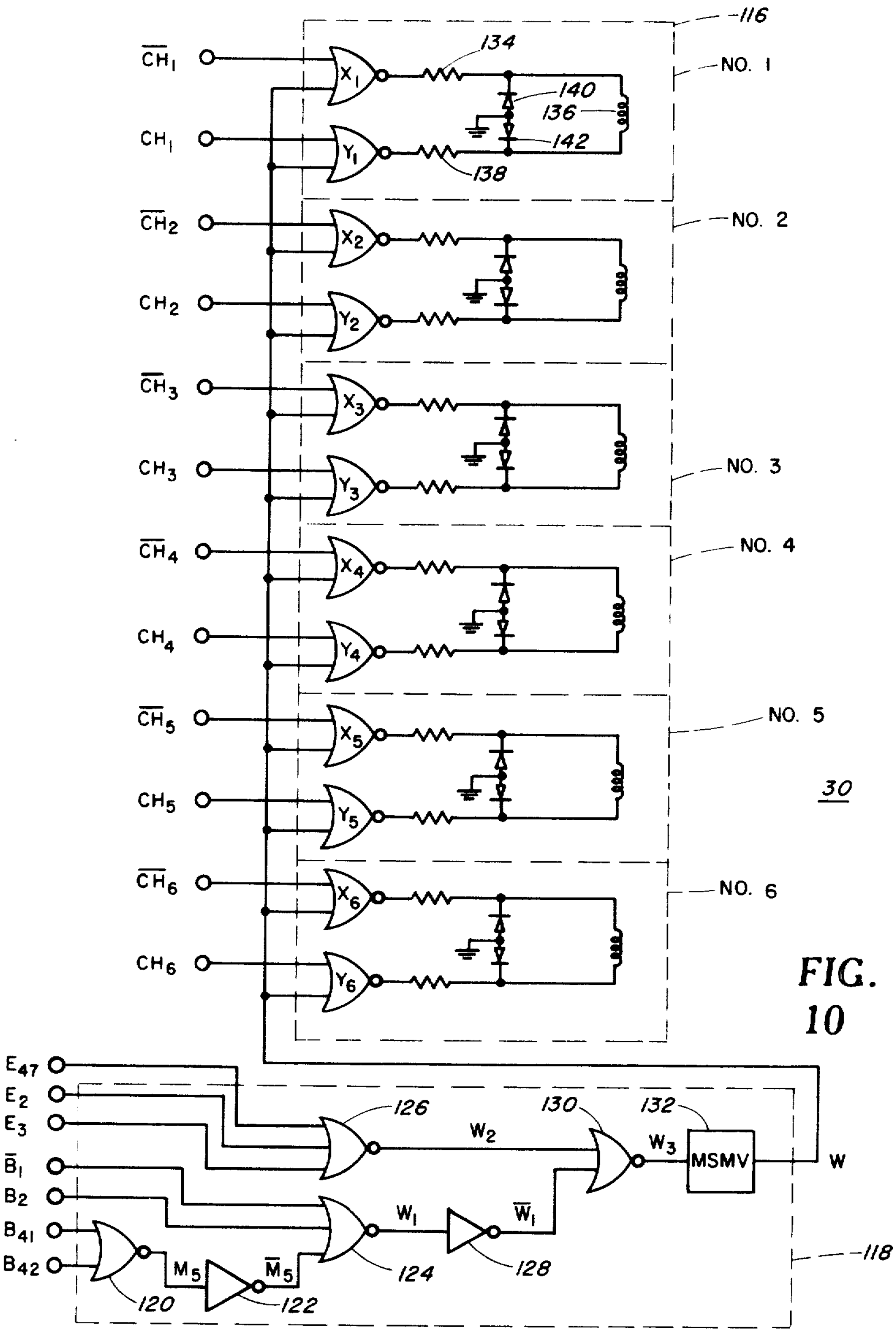
FIG. 10 is a schematic view of the tape recorder write circuits for the multi-channel tape recorder of Fig. 1.

Tape recorder write logic 30 for multi-channel tape recorder 28 is illustrated in FIG. 10 as composed of six writing channels 116 and a write transfer pulse circuit 118. It should be understood, however, that a tape recorder having a larger or a smaller number of channels may be used, depending upon the size of the data words to be recorded. Thus, for example, the maximum size of a data word in the instant embodiment is fourteen bits, and with two leading ones and two trailing ones a total word of 18 bits is to be recorded, which is broken into three parallel transfers of six bits each. If, however, the largest data word were to have 17 data bits, and to each data word two leading bits and two trailing bits were added, a seven channel tape recorder would be used with three parallel transfers of seven bits each.

For $j = 1,2 \ldots 6$, outputs $CH_j$ and $\overline{CH}_j$ from output gating network 27 and a write transfer pulse W, more fully described hereinafter, are applied to a tape recorder write channel No. $j$ in write circuit 116 in the following manner: Output $\overline{CH}_j$ and pulse W are applied to a NOR gate $X_j$, and output $CH_j$ and pulse W are applied to a NOR gate $Y_j$. Write transfer pulse W, illustrated in FIG. 13*a*, is generated in write transfer pulse circuit 118 in the following manner: Outputs $B_{41}$ and $B_{42}$ from counter 52 are applied to a NOR gate 120, producing an output $M_5 = \overline{B}_{41}\,\overline{B}_{42}$ therefrom. $\overline{M}_5$ is produced in an inverter 122, and along with $\overline{B}_1$ and $B_2$ from counter 52 is applied to a NOR gate 124, producing an output $W_1 = B_1\,\overline{B}_2\,M_5$. Outputs $E_2$ and $E_3$ from counter 52 and output $E_{47}$ from inverter 80 are applied to a NOR gate 126, producing an output $W_2 = \overline{E}_{47}\,\overline{E}_2\,\overline{E}_3$ therefrom. $W_1$ is inverted in an inverter 128, and $\overline{W}_1$ and $W_2$ are applied to a NOR gate 130, producing an output $W_3 = W_1\,\overline{W}_2$. Output $W_3$ is applied to a conventional monostable multivibrator 132, producing write transfer pulse W.

Since all of the write channels operate in the same manner, only No. 1 will be further described in detail. The output of NOR gate $X_1$ is applied through a current limiting resistor 134 to one side of a write coil 136. The output of NOR gate $Y_1$ is applied through a current limiting resistor 138 to the other side of write coil 136 thereby completing a series circuit through NOR gate $X_1$, resistor 134, write coil 136, resistor 138 and NOR gate $Y_1$. The NOR gates are chosen to be capable of acting as either current sinks or current sources. Thus, since the input information to NOR gate $X_1$ is the complement to the input information to NOR gate $Y_1$, a current will flow from one gate through write coil 136 to the other gate, the direction depending upon which gate is a source and which gate is a sink. As noted hereinbefore, the COS/MOS gating circuitry has the capability of acting as a source or a sink in addition to consuming extremely small amounts of power.

A pair of diodes 140 and 142 are connected back-to-back across write coil 136 to prevent reverse current flow through NOR gates $X_1$ and $Y_1$ at the completion of write pulse W. Diode 140 has its cathode connected to one side of write coil 136 and its anode connected to ground, while diode 142 has its cathode connected to the other side of write coil 136 and its anode connected to ground. At the conclusion of tape recorder write transfer pulse W, a pulse $STEP_2$ is generated by tape recorder motor drive circuit 31, as described hereinafter, that advances the tape so that the next six parallel bits of information may be recorded.

From FIG. 13*a* it will be observed that write transfer pulse W coincides with transfer pulses $F_1$, $F_2$, and $F_3$. Thus, as information is transferred from temporary storage register 26 to the inputs of tape recorder write circuitry 118, it is transferred to writing coils 136 and recorded on tape.

Figure 11:
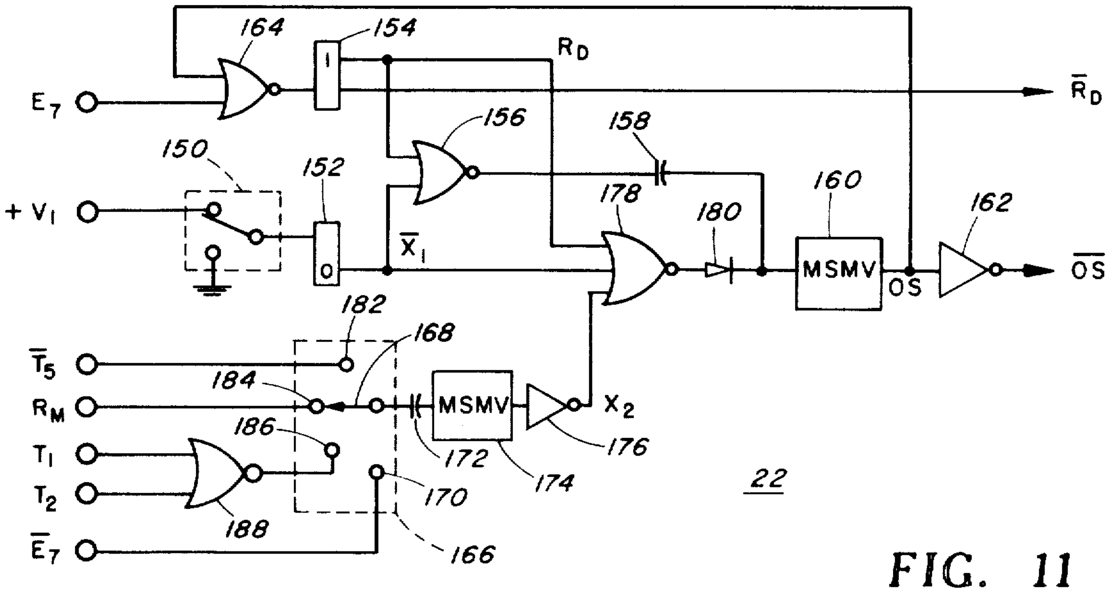
FIG. 11 is a schematic view of the start - stop circuitry of the present invention.
Figure 13C:
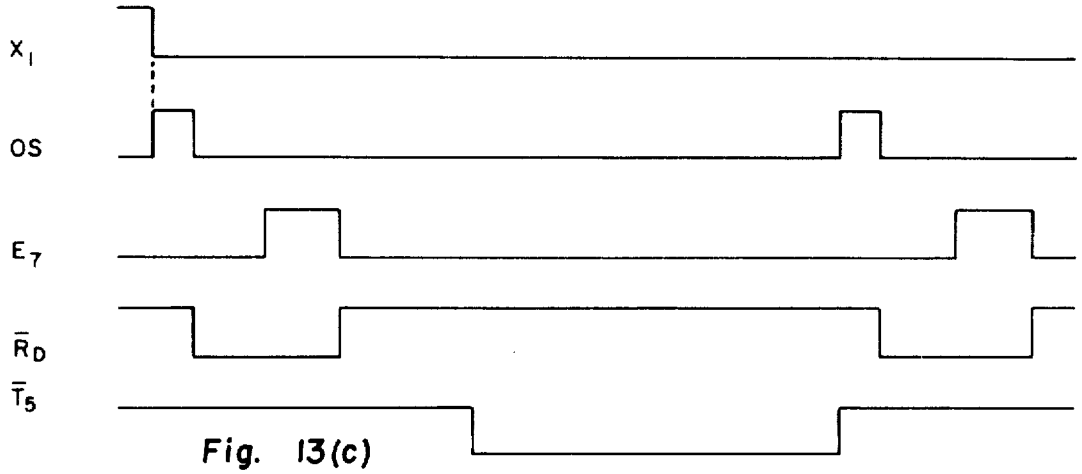

The start-stop control circuit 22 is illustrated in FIG. 11. To initiate operation of the data storage system a switch 150, such as a magnetic switch, is closed, connecting a flip-flop 152 to a positive potential $+V_1$, and causing it to be set to binary "1". The reset output $\overline{X}_1$ of flip-flop 152 and the set output $R_d$ of a flip-flop 154 are applied to a NOR gate 156. Initially, flip-flop 154 is reset so that set output $R_d$ is "0". Thus, the closure of switch 150 causes the output of NOR gate 156 to go from "0" to "1". This signal is passed through a capacitor 158 to a conventional monostable multivabrator 160 that generates a one-shot pulse OS, which may be, for example, 10 seconds duration. The pulse OS, illustrated in FIG. 13*c*, is inverted in an inverter 162, producing an output pulse $\overline{OS}$ that is applied to tape recorder motor drive circuit 31 to produce an inter-record gap on the type, as more fully described hereinafter. The reset output of flip-flop 154 is the control pulse $\overline{R}_d$ which is utilized in the logic time base generator circuitry of FIG. 5, as described hereinbefore.

Output OS is applied, along with output $E_7$ from counter 52, to a NOR gate 164. Output $E_7$ is normally "0", and, therefore the occurrence of pulse OS cause flip-flop 154 to be set. Thus, $\overline{R}_d$ becomes "0", enabling logic time base generator 23, as described hereinbefore.

As will be described hereinafter, start-stop control circuit 22 enables the data storage system to operate either in a continuous recording mode or in a sampled recording mode. In the continuous recording mode data is recorded for a preset period of time, for example 5 minutes, at the end of which the tape is advanced without any information being recorded, thereby producing a gap, of, for example, 10 seconds duration. At the end of the gap, data is again recorded. Thus, the continuous recording mode produces on tape a series of data intervals separated by short inter-record gaps.

In the sampled recording mode data intervals and inter-record gaps are also provided, but logic time base generator 23, and, consequently, the data storage system, is only operative during a portion of each data interval, for example, 5 minutes every hour, so that only a fraction of the input data is actually recorded. This mode of operation is desirable in situations where the input data is highly repetitive or varies only slightly during a data interval. By operating the system only a fraction of the time, battery power is conserved, especially in conjunction with COS/MOS logic elements which draw extremely little power in the quiescent state, on the order of 20 nanowatts per logic element. Additionally, magnetic tape is conserved, which is desirable for in-situ recording.

A conventional four position switch 166 having a wiper arm 168 enables selection of the operational modes. With arm 168 connected to a first terminal 170 output $\overline{E}_7$ from counter 52 is coupled to start-stop control circuit 22 and continuous operation is provided. Normally, $\overline{E}_7$ is binary "1". After counter 52 has counted to 512, however, $\overline{E}_7$ changes to "0", and, at a count of 1024, $\overline{E}_7$ returns to "138 . The positive going pulse is transferred through a capacitor 172 to a monostable multivibrator 174, causing a one-shot pulse to be generated. The output of monostable multivibrator 174 is inverted in an inverter 176, producing an output $X_2$ which is normally "1" but changes to "0" on the occurrence of the one-shot pulse.

Simultaneous to the occurrence of $\overline{E}_7$ changing from "0" to "1", $E_7$, which is applied to NOR gate 164 as described hereinbefore, changes from "1" to "0." Output OS, which is also fed to NOR gate 164, is normally "0". Therefore, when $E_7$ becomes "0", the output of NOR gate 164 changes from "0" to "1" and flip-flop 154 is reset, causing $\overline{R}_d$ to become "1", and inhibiting logic time base generator 23.

Set output $R_d$ of flip-flop 154, output $\overline{X}_1$ of flip-flop 152 and output $X_2$ of inverter 176 are applied to a NOR gate 178. As described hereinbefore, $\overline{X}_1$ becomes "0" when switch 150 is closed, and since outputs $R_d$ and $X_2$ become "0" on the hereinbefore described transition of $\overline{E}_7$ from "0" to "1", NOR gate 178 is enabled and a positive pulse is passed through a diode 180 to monostable multivibrator 160 which generates pulse OS.

Pulse OS is fed back to NOR gate 164, and since $E_7$ is "0", causes flip-flop 154 to be set again. With flip-flop 154 set, $\overline{R}_d$ is "0", logic time base generator 23 begins a new data interval and the data storage system again becomes operative. Thus, in the continuous mode of operation, the data interval corresponds to the time required to completely fill counter 52, which, in the instant embodiment is approximately 5 minutes, and between each data interval an inter-record gap of approximately 10 seconds duration is recorded.

In the sampled recording mode, three different data intervals are provided. If wiper arm 168 of switch 166 is connected to a terminal 182, output $\overline{T}_8$ of time storage register 20 is coupled to start-stop control circuit 22. Output $\overline{T}_8$ changes from "0" to "1" once every 2 hours, thus defining a data interval of 2 hours. When this transition occurs, the resulting positive going pulse is transferred through capacitor 172 to monostable multivibrator 174, producing a one-shot pulse. The one-shot pulse from monostable multivibrator 174 is inverted in inverter 176, causing output signal $X_2$ to change from "1" to "0".

Initially, flip-flop 154 is reset, so that $R_d$ is "0", and the data storage system is inhibited. Additionally, $\overline{X}_1$ remains "0" after switch 150 is closed. Therefore, on the occurrence of negative going pulse $X_2$, NOR gate 178 is enabled, and pulse OS is generated. Pulse OS is fed back to NOR gate 164, and, with $E_7$ at "0", flip-flop 154 is set. With flip-flop 154 set, logic time base generator 23 is enabled and the data storage system becomes operative.

As described hereinbefore, output $E_7$ of counter 52 changes from "1" to "0" at count 1024, which, with logic time base oscillator 50 having a frequency of 6.4 Hz, occurs approximately 5 minutes after counter 52 is enabled. At this transition, flip-flop 154 is reset and logic time base generator 23 is inhibited, and remains inhibited until signal $\overline{T}_4$ again changes from "0" to "1". Thus, with switch 166 connected to terminal 182, the data storage system is operative only for the first 5 minutes of each 2 hour data interval. The timing diagram of start-stop control circuit 22 in this mode of operation is illustrated in FIG. 13c.

If wiper arm 168 is connected to a terminal 184 pulse output $R_m$ from time storage register 20 is coupled to start-stop control circuit 22. $R_m$ occurs once every hour, and, consequently, the data storage system will be operative only for the first 5 minutes of every hour data interval. If wiper arm 168 is connected to a terminal 186, the data interval input to start-stop control circuit 22 is $\overline{T}_1\overline{T}_2$, which is produced by a NOR gate 188 coupled to outputs $T_1$ and $T_2$ from time storage register 20. This signal occurs once every 20 minutes, so that the data storage system is operative only for the first 5 minutes of every 20 minute data interval. Obviously, other outputs from time storage register 20 can be utilized to provide different data intervals, and the three data intervals selected are only exemplary.

Figure 12:
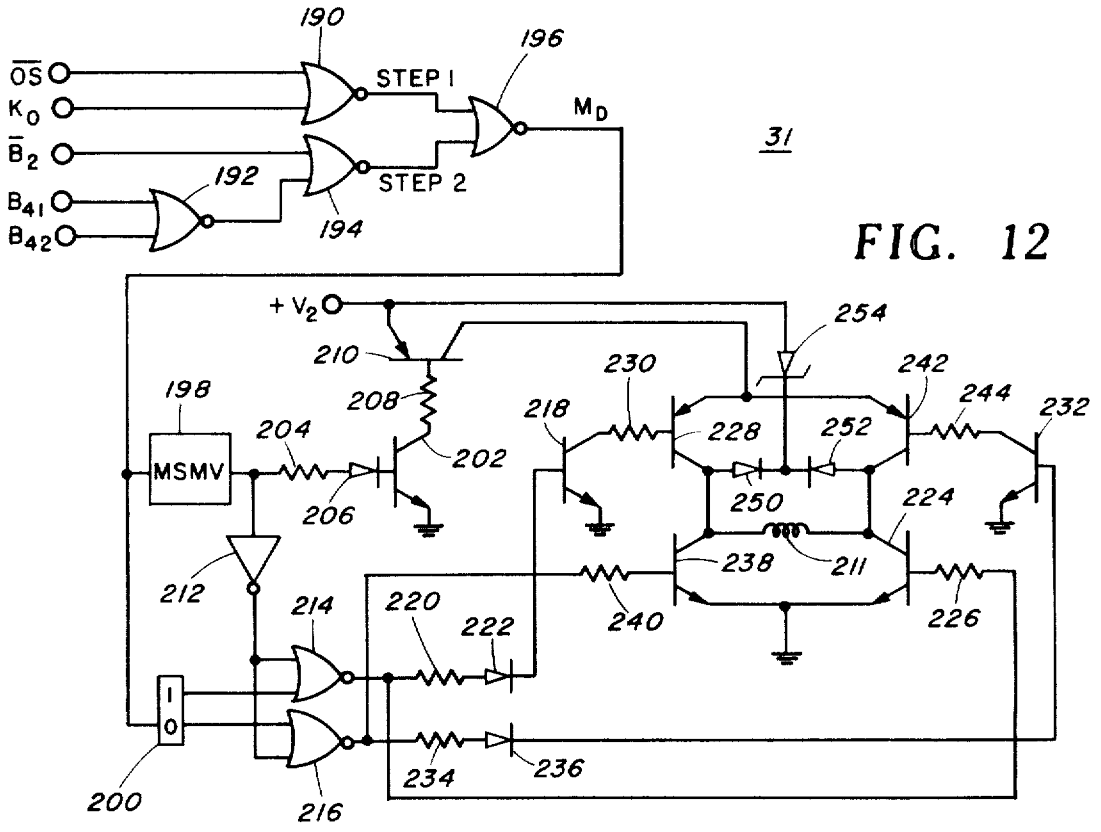
FIG. 12 is a schematic view of the multi-channel type recorder motor control circuitry.

Tape recorder motor drive circuit 31 is shown in FIG. 12 as being triggered by a motor drive signal $M_d$ that is generated in the following manner: $\overline{OS}$ from start-stop control circuit 22 and clocking signal $K_o$ from logic time base oscillator 50 are applied to a NOR gate 190, producing a signal $STEP_1$. Outputs $B_{41}$ and $B_{42}$ from counter 52 are applied to a NOR gate 192, and the output therefrom and output $\overline{B}_2$ from counter 52 are applied to a NOR gate 194, producing an output $STEP_2$. Outputs $STEP_1$ and $STEP_2$ are applied to a NOR gate 196, producing $M_d$. Thus, motor drive circuit 31 is triggered either by $STEP_1$ or $STEP_2$. As seen from FIG. 13a, $STEP_2$ is generated immediately after the termination of write signal W of FIG. 10. Thus, $STEP_2$ enables the tape to be stepped immediately after information has been recorded. $STEP_1$ is generated during the inter-record gapping interval produced by one shot pulse $\overline{OS}$ of FIG. 11, and has a frequency determined by clocking signal $K_o$. Since $STEP_1$, and consequently $M_d$ oscillate at the $K_o$ frequency, the aforementioned inter-record gap actually consists of a number of discrete steps in rapid succession.

Signal $M_d$ is applied simultaneously to a monostable multivibrator 198 and a flip-flop 200, connected in parallel. The one-shot output of monostable multivibrator 198 is applied to the base of an NPN transistor 202 through a resistor 204 and a diode 206, causing transistor 202 to turn "on". The collector of transistor 202 is connected through a resistor 208 to the base of a PNP transistor 210, and with transistor 202 "on", transistor 210 is also "on". Transistor 210 is the power gate that enables a current flow through the motor field windings during the motor stepping operation, described hereinafter, and prevents may current from reaching the motor field windings in the quiescent state.

The tape recorder drive motor of the instant embodiment may be, for example a Sigma motor having field windings 211 connected in series. In this configuration a single drive circuit may be employed if the direction of current flow through field windings 211 is reversed for each step. This current reversal is achieved in motor drive circuit 31, as described hereinafter.

The one-shot output of monostable multivibrator 198 is applied to an inverter 212. The output of inverter 212, which is normally "1" but changes to "0" on the occurrence of pulse $M_d$, and the set output of flip-flop 200 are applied to a NOR gate 214. Similarly, the output of inverter 212 and the reset output of flip-flop 200 are applied to a NOR gate 216. Thus, if flip-flop 200 is reset by pulse $M_d$, NOR gate 214 produces an output pulse, and if flip-flop 200 is set by pulse $M_d$, NOR gate 216 produces an output pulse. As described hereinafter, this selection determines the direction of current flow through windings 211.

An output pulse from NOR gate 214 is fed to the base of an NPN transistor 218 through a resistor 220 and a diode 222, and to the base of an NPN transistor 224 through a resistor 226, thereby turning transistors 218 and 224 "on". The collector of transistor 218 is connected to the base of a PNP transistor 228 through a resistor 230. With transistors 210 and 218 turned "on", transistor 228 conducts and a current from source $+V_2$ flows through a series circuit consisting of transistors 210 and 228, field windings 211, and transistor 224 to ground.

An output pulse from NOR gate 216 is fed to the base of an NPN transistor 232 through a resistor 234 and a diode 236, and to the base of an NPN transistor 238 through a resistor 240, thereby turning transistors 232 and 238 "on". The collector of transistor 232 is connected to the base of a PNP transistor 242 through a resistor 244. With transistors 210 and 232 turned "on", transistor 242 conducts and a current from source $+V_2$ flows through a series circuit consisting of transistors 210 and 242, field windings 211, and transistor 238 to ground. Thus, it will be noted that the current flow through windings 211 when NOR gate 214 is enabled is in the opposite direction to the current flow through windings 211 when NOR gate 216 is enabled.

Motor drive circuit 32 additionally includes circuitry for preventing the back emf in winding 211 from reaching source $+V_2$. A pair of diodes 250 and 252 are connected cathode-to-cathode in series between the collectors of transistors 228 and 242. A zener diode 254 has its cathode connected at the common junction of diodes 250 and 252, and its anode connected to the positive source $+V_2$.

From the foregoing description it will be apparent that the data storage system of the present invention receives digital sampled data and digital event data from an in-situ measuring device, generates digital time data, parallel transfers this data to a 14 stage temporary storage register, and parallel transfers the data from the temporary storage register to a six channel tape recorder where it is recorded. It will also be apparent that by using this data processing technique in conjunction with low power COS/MOS integrated circuitry, increased reliability and a substantial reduction in power arc achieved.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A data storage system for recording digital input data from a measuring device, said system comprising:
first input means for counting specified events in said digital input data for a preset time interval and for producing digital event rate data therefrom;
second input means for sampling a portion of said digital input data in response to a sampling transfer signal and for producing digital sampled data therefrom;
timing means for generating digital timing data indicative of the time of occurrence of said digital event data and said digital sampled data;
control logic means having five outputs, said outputs respectively resetting said first input means to zero count at the end of said preset time interval, generating said sampling transfer signal, and producing a first sequence of digital data containing said digital timing data, said digital event data, and said digital sampled data;

start-stop control means for initiating and terminating the operation of said control logic means;

first storage means operable in response to said control logic means for temporarily storing said first sequence of digital data and for generating therefrom a second sequence of digital data; and second storage means for permanently recording said second sequence of digital data.

2. The data storage system of claim 1, wherein said first input means comprises:

pulse generating means connectable to said measuring device for producing an output pulse upon the occurrence of said specified event; and a binary step-down counter for counting output pulses from said pulse generating means during said preset time interval, at the conclusion of which interval said binary step-down counter is reset to zero count in response to said control logic means.

3. The data storage system of claim 1, wherein said second input means comprises:

gating means connectable to said measuring device and operable in response to said sampling signal from said control logic means for passing said portion of said digital input data to said first storage means.

4. The data storage system of claim 3, wherein said gating means comprises a plurality of AND gates, one input of each of said AND gates receiving a bit of said portion of said digital input data, and another input of each of said AND gates receiving said sampling signal.

5. The data storage system of claim 1, wherein said timing means comprises:

time base oscillator means for generating a fixed frequency timing signal;

a first binary step-down counter for frequency dividing said fixed frequency timing signal;

a binary divide-by-12 counter having a first plurality of stages for dividing the output of said first binary step-down counter by 12;

a second binary step-down counter connected to the output of said divide-by-12 counter and having a second plurality of stages, wherein said digital timing data comprises the outputs of said first and said second plurality of stages.

6. The data storage system of claim 5, wherein said time base oscillator means comprises a crystal oscillator.

7. The data storage system of claim 1 wherein said control logic means comprises:

logic time base oscillator means for generating a logic timing signal;

a binary step-down counter having a plurality of stages, each stage having a set output and a reset output;

first gating means comprising a plurality of logic elements operable in response to said logic timing signal and to said set and said reset outputs of said plurality of step-down counter stages for generating a first control signal for effecting a resetting of said first input means to zero count, for generating said sampling transfer signal, for generating a digital event data transfer signal, and for generating a digital timing data transfer signal; and second gating means receiving said digital timing data said digital event data, and said digital sampled data, and operable in response to said digital event data transfer signal and to said digital timing data transfer signal, for generating said first sequence of digital data.

8. The data storage system of claim 1, wherein said first storage means comprises:

a plurality of flip-flops coupled to said control logic means for temporarily storing said first sequence of digital data;

third gating means for generating a plurality of gating signals;

fourth gating means having a plurality of gates for passing the outputs of selected ones of said plurality of flip-flops in response to said plurality of gating signals, thereby generating said second sequence of digital data; and fifth gating means coupled to said third and fourth gating means for effecting transmission of said second sequence of digital data to said second storage means.

9. The data storage system of claim 1, wherein said second storage means comprises:

sixth gating means operable in response to said control logic means for generating a write transfer signal; and means coupled to said first storage means and operable in response to said write transfer signal for writing said second sequence of digital data on magnetic tape; and means responsive to said start-stop control means and said control logic means and connectable to a tape recorder drive motor for operating said motor and thereby advancing said magnetic tape.

10. The data storage system of claim 9, wherein said writing means comprises a plurality of writing channels, each channel comprising:

a first and a second NOR gate, said NOR gates capable of acting as either current sinks or current sources, said first NOR gate receiving as input data the binary complement of the input data to said second NOR gate, and said first and said second NOR gates operable in response to said write transfer signal for passing said received input data;

a series circuit comprising a first and a second current limiting resistor, and a write coil, said first current limiting resistor connected between the output of said first NOR gate and one end of said write coil, and said second current limiting resistor connected between the output of said second NOR gate and the other end of said write coil;

a first diode having its cathode connected to one end of said write coil and its anode connected to a reference potential; and a second diode having its cathode connected to said other end of said write coil and its anode connected to said reference potential, whereby the digital information that is permanently recorded on magnetic tape is dependent upon the direction of current flow through said write coil.

11. The data storage system of claim 9, wherein said means for operating said motor comprises:

seventh gating means for generating a drive pulse in response to output signals from said start-stop control means and said control logic means;

a flip-flop and pulse generating means coupled in parallel to the output of said seventh gating means;

power gating means coupled to said pulse generating means for passing current from a source of energy to said motor operating means;

eight gating means operable in responsive to output signals from the set output of said flip-flop and said pulse generating means for passing current from said source of energy through a field winding of said tape recorder drive motor in a first direction; and ninth gating means operable in response to the reset output of said flip-flop and said pulse generating means for passing current from said source of energy through said field winding of said tape recorder drive motor in a direction opposite to said first direction.

* * * * *